Patented Jan. 10, 1939

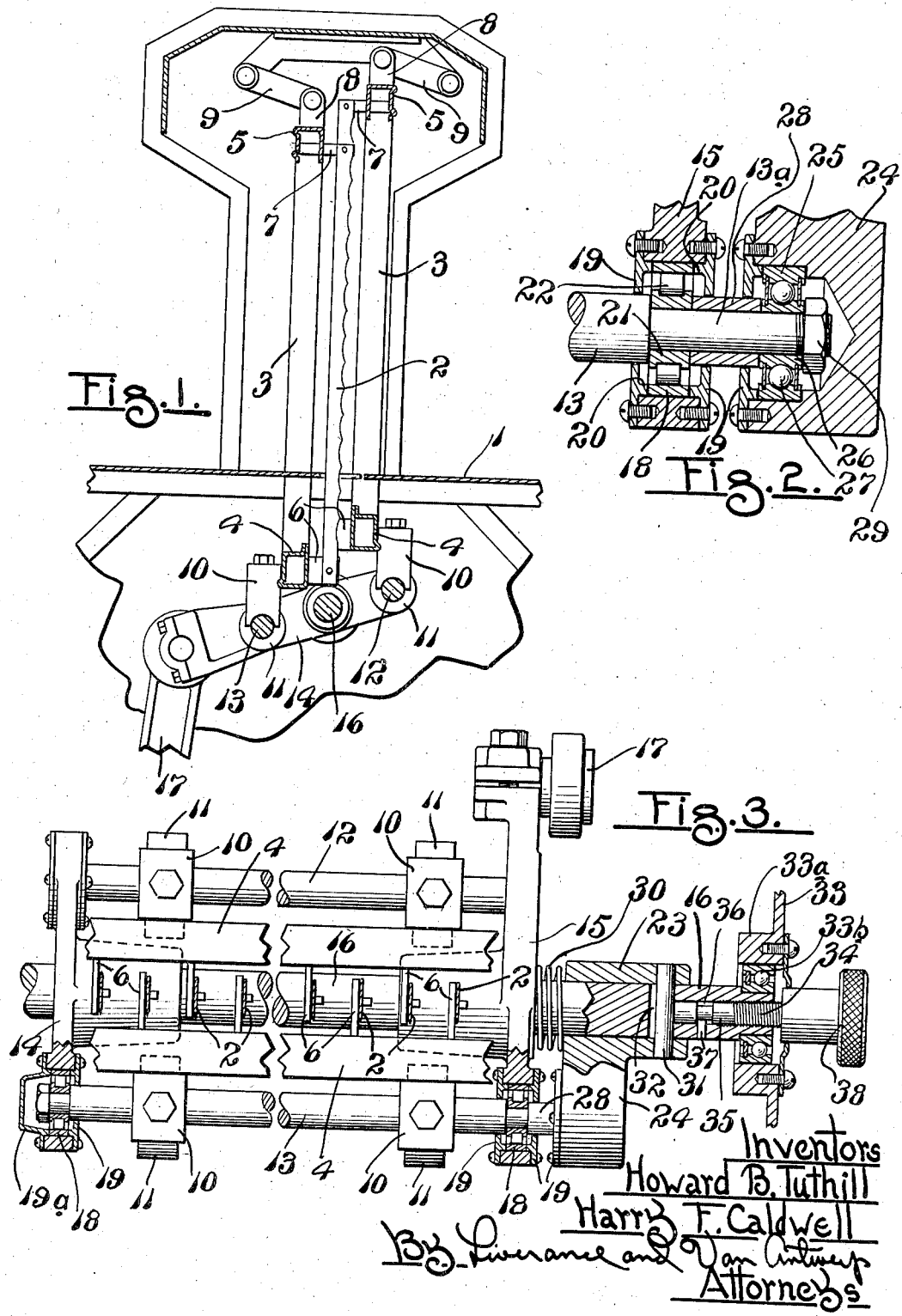

2,143,460

UNITED STATES PATENT OFFICE 2,143,460

KNIFE ADJUSTMENT IN BREAD SLICING MACHINES

Howard B. Tuthill and Harry F. Caldwell, Grand Rapids, Mich., assignors to Oliver Machinery Company, Grand Rapids, Mich., a corporation of Michigan Application April 19, 1937, Serial No. 137,636

10 Claims. (Cl. 146—153)

This invention is concerned with an improvement in bread slicing machines.

It is common practice to slice loaves of bread to divide the loaf into a plurality of slices all having the same thickness. The usual bread slicing machine has two banks or series of vertically reciprocating knives which are operated so as to move simultaneously in opposite directions. The knives of one series are in alternate relation to those of the other. Such knives usually pass through slots in a table or chute over which the bread is moved to and carried past the knives to the other side thereof.

The vertically positioned reciprocating knives are spaced equal distances from each other so that the loaf of bread is sliced into a plurality of slices of equal thickness.

With our invention a novel structure for adjusting one of the banks or series of knives laterally is provided whereby alternate slices of bread are of differing thicknesses, and in the slicing of a loaf of bread into a plurality of slices, half of the slices will be thinner than the normal thickness of a slice of bread and the other half of the slices will be thicker. There is thereby obtained both relatively thin and relatively thick slices of bread so as to satisfy the tastes of a number of people, such as in a family, some of whom will want the thinner slices and others the thicker slices of bread.

An understanding of the invention and of the structure which we have devised for securing the object and result stated, as well as others not at this time particularly enumerated may be had from the following description, taken in connection with the accompanying drawing, in which—

Fig. 1 is a fragmentary longitudinal section through a bread slicing machine to which my invention may be applied.

Fig. 2 is a fragmentary enlarged horizontal section through the mounting for one of the rods which carries one of the banks or series of slicing blades, such rod being longitudinally adjustable for shifting the bank of slicing blades laterally, and Fig. 3 is a fragmentary horizontal section and plan showing the mechanism by means of which said rod is longitudinally adjusted to change the position of the bank of knives associated with and carried by said rod.

Like reference characters refer to like parts in the different figures of the drawing.

In bread slicing machines the bread is moved over a table or chute 1 to the cutting edges of a plurality of spaced vertically positioned slicing knives, and thence past said knives. There are two series or banks of these knives, each being carried by a frame having spaced apart vertical side frame members 3, a horizontal lower frame member 4 and horizontal upper frame member 5. The two frames are spaced from each other as shonw in Fig. 1, and from the lower bars 4 tongues 6 extend toward each other. Similarly from the upper bars 5 tongues 7 extend horizontally toward each other. Between the tongues 6 and 7 blades 2 are extended, being held on lateral pins on said tongues as shown in Fig. 3. The blades of one bank or series are positioned in alternate relationship to the blades of the other bank and all of the blades are positioned so that their cutting edges are substantially in the same vertical transverse plane.

The upper ends of the frames which carry the slicing knives have projecting lugs 8 connecting to flexible links 9 which in turn are pivotally connected at opposite ends upon suitable housing supports. The lower frame members 4 are permanently secured to blocks 10 which have collars 11 at their lower ends and the collars are passed over horizontal rods 12 and 13, respectively, and are fixedly secured in place by means of set screws shown as passing downwardly through said blocks 10. The rods 12 and 13 extend between rocker bars 14 and 15, said bars being connected to a rock shaft 16 which extends horizontally substantially midway between the rods 12 and 13. The bar 15 at one end is extended outwardly, and has a pivotal connection to an operating bar 17 which is longitudinally reciprocated in any suitable manner to rock the shaft and thereby simultaneously move the two banks of blades vertically in opposite directions.

The rod 12 is mounted so that it may have a rotative or rocking movement in the arms 14 and 15 and when once assembled therewith it remains in a substantially fixed relation thereto and is not longitudinally adjustable. The other rod 13 has a limited longitudinal adjustment whereby the blades which are associated with and carried by said rod are adjustable laterally to vary the distance between them and the cutting blades of the other bank or series of blades which are associated with and carried by the rod 12. Such adjustment of the blades brings some of the blades closer together than they were previously and separates others farther apart, thereby obtaining the narrower and the thicker slices of bread previously mentioned.

In the ends of the arms 15 where the rod 13 is mounted are circular openings within which an outer cylindrical ring 18 of a roller bearing is mounted as best shown in Fig. 2. Plates 19 are secured at opposite sides of the arm 15 and have continuous annular inwardly extending ribs 20 coming against the opposite ends of the ring 18. The rod 13 at one end is elongated and reduced in diameter as at 13a and extends through said plates 19. The part 13a carries a second or inner sleeve 21 of the roller bearing, which sleeve is grooved around its peripheral surface to make a channel groove in which anti-friction rollers 22 are mounted. It is evident that the rod 13 may have a limited longitudinal movement, the rollers 22 moving laterally with the longitudinal movement of the rod 13, the bearing ring 18 having a width sufficiently greater than the length of the rollers 22 that such limited movement may take place without the rollers passing beyond the limits of such bearing ring or sleeve 18.

On the rock shaft 16 a sleeve 23 is mounted for sliding movement a short distance from the rocking arm 15. It has an arm 24 extending laterally therefrom paralleling the projecting portion of the bar 15 at one side of the shaft 16. Said arm 24 has a recess in its side in which an outer ring 25 of an anti-friction ball bearing is pressed coming against a shoulder within the recess at its inner end and being held by a like annular rib 20 on a plate 19 secured at the inner side of the arm 24 directly opposite the adjacent plate 19 on the rocking arm 15, the rib 20 pressing against the outer end of the bearing ring or sleeve 25. An inner sleeve 26 is placed over the outer end portion of the reduced section 13a of the rod 13 between which and the inner ring 21 of the previously described bearing is a spaced sleeve 28 which may have substantially the same exterior diameter as the main or body portion of the rod 14. A nut 29 secured upon the end of the part 13a binds the sleeves 21, 28 and 26 together as shown in Fig. 2. The opposite end of the rod has exactly the same roller bearing construction consisting of the inner sleeve 21, the outer sleeve 18, the rollers 22 between, the plate 19 and a modified housing plate 19 as shown, with a nut at the reduced end portion bearing against the inner sleeve 21, whereby the same bearing structure is provided for the rod 13 permitting longitudinal movement.

Between the rocking bar 15 and the adjacent sleeve 23 is a coiled compression spring 30 located around the rock shaft 16. A transverse pin 31 passes through said sleeve and through a slot 32 in the shaft 16, which slot is elongated so as to have a dimension greater than the diameter of the pin 31 and permit an adjustment longitudinally of the rod 13 equal to the free space in the slot 32 left between the pin and the end of the slot as shown in Fig. 3. The shaft 16 extends to and is mounted in a suitable roller bearing in a side 33 of the stationary lower housing support of the machine. Said side 33 is provided with a collar 33a in which a roller bearing assembly 33b is mounted the inner sleeve thereof being pressed over a reduced end of the shaft 16 (see Fig. 3).

From the slot 32 outwardly the shaft 16 is axially bored and is threaded at its outermost portion for a distance. A rod having a threaded section 34 screws into said opening and at its inner end portion is slightly reduced in diameter and is without threads, as at 35. Between the ends of the unthreaded section 35 it is reduced in diameter, thereby providing a continuous annular recess 36 as shown. A pin 37 extends from one side of the shaft 16 into said recess, thereby limiting the extent of outward movement of the screw threaded portion 34 when turned by a knob 38 secured thereto and which has a knurled head for manual operation.

With the parts in the position shown in Fig. 3 the cutting blades of the two series or banks of blades are adjusted equal distances apart. Operating the knob 38 so as to screw the screw threaded section 34 inwardly will cause the pin 31 to traverse the slot 32 to the left (Fig. 3) compressing the spring 30 and moving the rod 13 to the left, thereby changing the distances between adjacent cutting blades, bringing alternate blades closer together and next blades farther apart from each other so that upon a loaf of bread being passed through the machine one-half of the slices are narrower than the slices would be if the parts occupied at the position shown in Fig. 3 and the other half of the slices are wider. The maximum amount of adjustment is controlled by the distance that the pin 31 may be moved in the slot 32. Of course, any intermediate adjustment between the extremes of adjustment may be used.

With this construction a practical and efficient mechanism is provided for the desired adjustment of the slicing knives of a bread slicing machine of the character described toward or away from each other a limited amount so as to provide both relatively thin and relatively thick slices of bread with the same slicing operation. The invention is defined in the appended claims and is to be considered comprehensive of all forms of structure coming within their scope.

We claim:

1. In a bread slicing machine having two banks of knives, each bank including a plurality of spaced apart substantially vertically positioned slicing knives, said knives of each bank of knives being mounted in a frame and each of said frames being secured to a rod, said knives of the two banks of knives being located with their cutting edges in the same vertical plane and the knives of one bank in alternate relation to the other, and said machine having means for vertically reciprocating the banks of knives simultaneously in opposite directions, means for longitudinally regulating one of said rods to which one of said frames is connected, to laterally adjust one of said banks of knives, all of said knives of said bank being simultaneously moved with respect to the knives of the other bank of knives.

2. In a bread slicing machine, a rock shaft, spaced parallel bars attached to said rock shaft between their ends and extending in opposite directions therefrom, rods mounted on said bars on opposite sides of and parallel to the rock shaft and to each other, a substantially vertical frame attached to each rod, spaced apart knives extending vertically in each of said frames, the knives of one frame being located in alternate relation to the knives of the other frame and with the cutting edges of all of said slicing knives substantially in the same plane, and manually operable means mounted on the rock shaft and operably connected with one of said rods for longitudinally adjusting said rod a limited distance.

3. A construction containing the elements in combination defined in claim 2, said longitudinally adjustable rod being mounted in roller bearings at one of the ends of said bars, and said manually adjustable means mounted on the rock shaft including a sleeve slidable on the rock shaft, means for limiting the longitudinal movement of the sleeve, and means connecting the sleeve with one end of said rod whereby longitudinal movement of the sleeve longitudinally moves said rod.

4. In a bread slicing machine, a rock shaft, parallel spaced apart bars mounted on said rock shaft between their ends, two rods mounted for turning movement about their longitudinal axes carried on and extending between said bars, one at each side of the rock shaft, a sleeve slidably mounted on said rock shaft, a pin extending through the sleeve and rock shaft, said rock shaft having a slot therein through which the pin passes to limit the extent of movement of the sleeve, an arm extending from the sleeve, and a rotatable connection between the arm and of one of said rods, combined with means for longitudinally adjusting said sleeve.

5. In combination, a rock shaft, parallel spaced apart bars mounted between their ends transversely on said rock shaft, rods mounted for turning movement about their longitudinal axes on and extending between said bars, one at each side of the rock shaft, a sleeve slidably mounted on the rock shaft, a pin extending through the sleeve and rock shaft, said rock shaft having a slot therein through which the pin passes the length of the slot being slightly greater than the diameter of the pin, an arm extending from the sleeve, a rotatable connection between the arm and one of said rods, and a screw threaded axially into one end of the rock shaft and bearing against said pin, as specified.

6. A construction containing the elements in combination defined in claim 5 combined with a compression spring between said sleeve and one of said bars moving said sleeve outwardly when free to do so, the screw acting upon said pin to move the sleeve inwardly and compress said spring.

7. In combination, a rock shaft, spaced apart bars fixed on said rock shaft between their ends, rods extending between said bars and parallel to the rock shaft, one at each side thereof, means for mounting one of said rods on the bars for longitudinal adjustment, means mounted for lengthwise movement on said rock shaft and connected to one end of said longitudinally movable bar, and manually operable means mounted on the rock shaft and adapted to operatively engage the first mentioned means to move it in one direction and thereby longitudinally adjust the rod associated therewith.

8. A bread slicing machine comprising, two banks of spaced apart knives, means for mounting each of said banks of knives for reciprocation, one of said mounting means having an axis of oscillation, means for reciprocating said banks of knives and means located at said axis of oscillation for adjusting said last named mounting means longitudinally of said axis of oscillation.

9. A bread slicing machine comprising, a rock shaft, means for oscillating said rock shaft, separate means mounted on said rock shaft for carrying respectively two banks of knives, one of said carrying means being slidable longitudinally of said rock shaft and means located at the axis of said rock shaft for adjusting said slidable mounting means longitudinally of said rock shaft.

10. A bread slicing machine comprising, a rock shaft, two banks of parallel spaced apart knives, means connected with said rock shaft for reciprocating said knives, and means manually operable during reciprocation of said knives to laterally adjust one of said banks of knives with relation to the other of said banks, said manually operable means including a sleeve slidable on said rock shaft and means for limiting longitudinal movement of said sleeve.

HOWARD B. TUTHILL.
HARRY F. CALDWELL.